Richard S. Moore
INVENTOR.

BY James F. Weiler
Henry W. Hope
Dudley R. Dobie, Jr.

ATTORNEYS

United States Patent Office 3,572,372
Patented Mar. 23, 1971

3,572,372
ADJUSTABLE SAFETY RELIEF VALVE
Richard S. Moore, Houston, Tex., assignor to Sage Fabricating, Inc., doing business as Sage Engineering and Valve Company, Houston, Tex.
Continuation-in-part of application Ser. No. 820,387, Apr. 30, 1969. This application July 14, 1969, Ser. No. 841,509
Int. Cl. F16k 17/04
U.S. Cl. 137—477          18 Claims

ABSTRACT OF THE DISCLOSURE

An improved safety relief valve of the type having a housing defining an enclosure for the valve; a cylindrical orifice member secured at one end to and within the housing for fluid communication with a vessel the pressure of which is to be regulated, said orifice member having an axial bore for flow of fluid therethrough; a disk coaxial with the orifice member for normal sealing engagement therewith; a perforated sleeve secured to the disk for guiding the disk about the orifice member; and spring means operatively associated with the disk to maintain it in normal sealing relation with the orifice member but yieldable to unseat the disk upon exposure of the disk to a predetermined pressure from the vessel.

CROSS-REFERENCES TO RELATED APPLICATIONS

The present application is a continuation-in-part of application Ser. No. 820,387 filed Apr. 30, 1969, entitled, Improved Adjustable Safety Relief Valve and which is now abandoned in favor of this application.

BACKGROUND OF THE INVENTION

Safety relief valves are necessary appurtenances to chemical process vessels of infinite varieties, pressure chambers, systems and the like to provide means for venting fluid from within when such fluid approaches high levels of pressure which if not released might cause severe damage, rupture or explosion of the equipment. Typical of safety relief valves functioning to rapidly vent high pressure fluid but closeable to avoid complete exhaustion of a system is the orifice and the spring-loaded disk type of valve. The conventional arrangement of this type of valve includes a cylindrical orifice member secured to a vessel at one end and having a disk member at the other end. Spring means bias the disk against the orifice so that the disk is unseated only when subjected to a predetermined pressure of the fluid from within the vessel to overcome tension of the spring. When the disk is unseated from the orifice member, fluid passes out of the vessel and through the valve until pressure drops sufficiently so that the tension of the spring again forces the disk back into sealing engagement with the orifice member to close the valve.

Conventional disk valves have been adjustable for purposes of varying tension of the spring against the disk member to alter the pressure at which the disk will "pop" or unseat from the orifice member. Thus such valves have been designed and manufactured so as to operate by popping and then closing at given pressures, being adjustable only to permit calibration to assure functioning of the valve at designed pressures.

It would be highly advantageous to provide a disk type of safety relief valve wherein the valve not only will pop at a predetermined, calibrateable pressure but which may be adjusted easily to alter the pressure at which the valve closes without sacrificing effectiveness of operation while improving functioning of the valve from normal closure through the opening and reclosing cycles. The present invention is directed to just such an improved valve device.

SUMMARY OF THE PRESENT INVENTION

The present invention is directed to a marked improvement over conventional spring loaded disk-orifice types of safety relief valves. In the device of the invention, a ring member is provided peripherally of the disk in an adjustable yet secure relation therewith so as to alter when desired the pressure at which the valve closes. Secured about the disk and ring member is a sleeve which tapers to a smaller diameter so as to engage about and be guided by the orifice member to in turn guide the disk as it disengages from and then re-engages with the orifice member.

A unique seat configuration is provided at the interface between the orifice member and the disk so that smooth and positive closure of the valve results even when trash and debris are present. The seat configuration is such that any abrasives and the like that might flow through the valve do not result in wear or damage to the seat. Such novel features of the present device result in outstanding, reliable and predictable functioning of the valve not contemplated by prior art devices.

It is, therefore, an object of the present invention to provide a spring-loaded disk and orifice type of safety relief valve with means for adjusting the pressure at which the valve closes as well as means for speeding full opening of the valve so as to be adaptable to the desired operating conditions under the circumstances in which the valve may be used.

Still another object of the present invention is the provision of such a valve capable of a fast pop or opening action and being accommodative of high flow rates of fluid therethrough for quickly exhausting the vessel being regulated, the valve also being capable of quick closure even at small differentials of pressure reduction after pop.

Another object of the present invention is the provision of such a valve wherein raised face seat means are provided between the disk and the orifice member so that the disk may sealingly engage with the orifice in smooth, positive relation even when debris is present.

Yet a further object of the present invention is the provision of such a valve that is adjustable to provide an optimum rate of flow for a given pop pressure in order that pressurized fluid may be vented through the valve rapidly, the valve being adjustable so as to close smoothly at a predetermined desired pressure without completely exhausting the fluid from the vessel source.

A still further object of the present invention is the provision of such a valve wherein movement of the disk is guided by sleeve means engaging about the orifice member resulting in a much more compact valve package operating with greater reliability than conventional safety relief valves.

Still another object of the present invention is the provision of such a valve which will function effectively even when moisture or other liquids are present in a gas passing through the valve, formation of ice from the moisture on sealing surfaces being prevented to assure proper valve closure.

Other and further objects, features and advantages will be apparent in the following description of preferred embodiments of the invention, given for the purpose of disclosure and taken in conjunction with the accompanying drawings.

DESCRIPTION OF THE DRAWINGS

In the drawings forming a part of the disclosure herein, like character references designate like parts throughout the several views wherein.

DESCRIPTION OF THE PREFERRED EMBODIMENT

Figure 1:
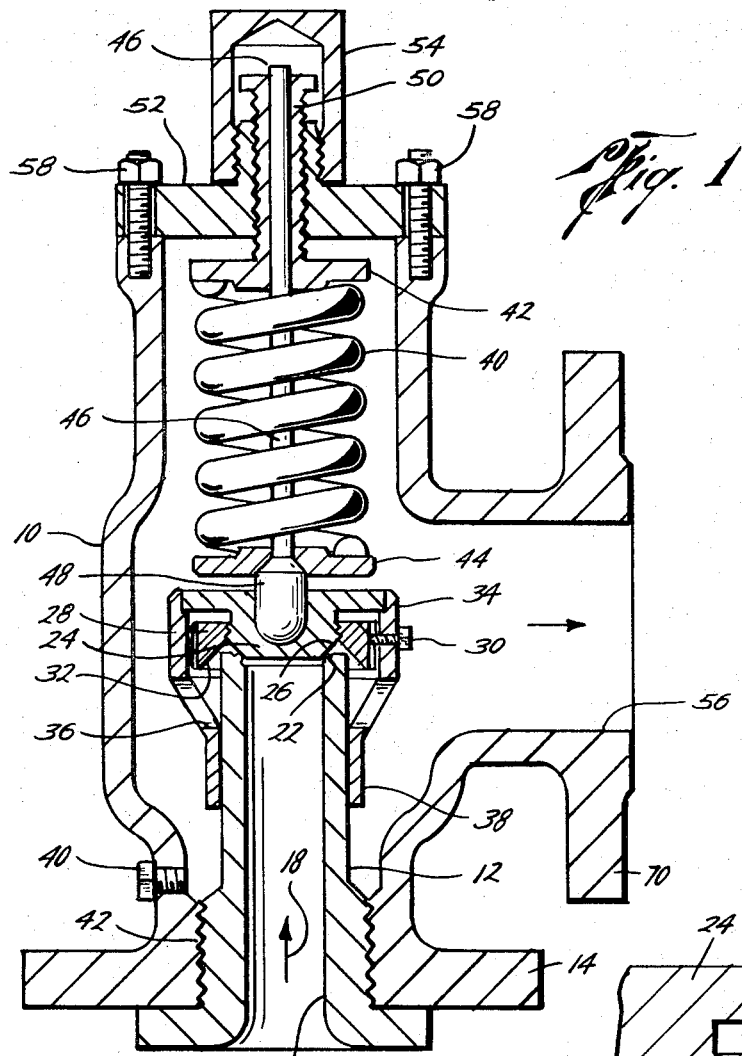
FIG. 1 is an elevational view predominantly in cross-section showing the improved valve of the present invention.

With reference to FIG. 1, the improved safety relief valve of the present invention is shown having an outer housing 10 defining an enclosure for the valve. A cylindrical orifice member 12 is secured at one end to the housing 10 for fluid communication with, for example, a process vessel (not shown). Attachment of the body member to the vessel may be effected such as by bolting the flange 14 of the housing to the vessel.

Figure 2:
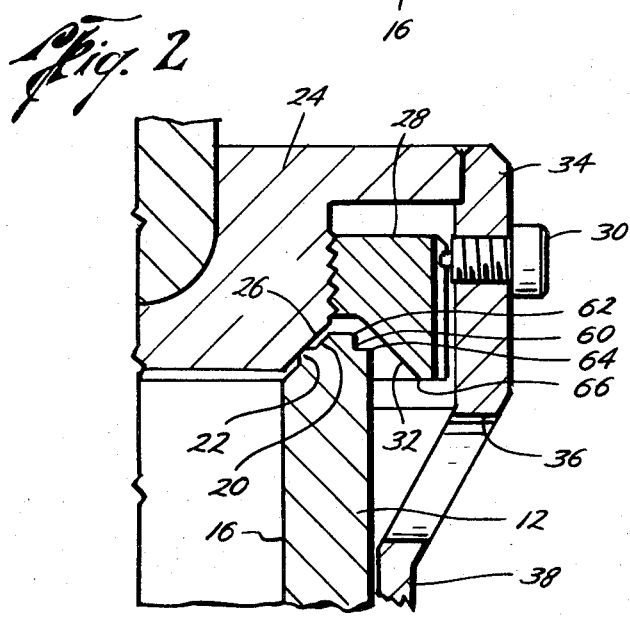
FIG. 2 is a partial cross-sectional view of the improved adjustable disk and orifice member arrangement of the present invention.

The orifice member 12 has an axial bore 16 for flow of fluid therethrough as represented by the arrow 18. At the inner or downstream end of the orifice member 12 and as better shown in FIG. 2, is provided a beveled surface 20 at the junction of the end of the orifice member with its bore wall 16. Such beveled surface is integrally provided with a raised face 22 forming an annular seat coaxial with the bore. While the function of the raised face 22 will be discussed in more detail hereafter, it is to be noted that such face is of a trapezoidal cross-sectional configuration, the short parallel side of which faces inwardly.

A disk 24 is located adjacent the orifice member 12 for normal seated and sealing engagement with the raised face 22 of the beveled surface 20. The edge 26 of the disk 24 toward the beveled surface 20 of the orifice member is chamfered at a substantially complementary angle to the angle of such beveled surface so as to seat satisfactorily on the raised face 22. A ring member 28 is secured preferably by threadable engagement about the periphery of the disk 24 for axial adjusting movement of the ring relative to the disk. A stop bolt 30 may be provided to lock the ring member 28 into position once any desired adjustment is made. The ring member has an inwardly facing beveled surface 32 adjacent the chamfer 26 of the disk 24 to direct flow of fluid upon opening of the valve as will be described.

With reference to FIG. 1 (and the detail of FIG. 2) of the drawing, secured to the disk 24 exteriorly of the ring member 28 is a perforated cylindrical sleeve 34 for slidable coaction with and about the orifice member 12 so as to guide the disk 24 in its axial movement. As can be seen from the drawing, the sleeve 34 surrounds the ring member 28 and tapers to a smaller diameter portion 38 for slidable engagement about the orifice member 12. Perforations in the sleeve 34 include a plurality of ports 36 through and spaced about the circumference of the sleeve at the point of taper thereof.

The disk 24 is biased in normal seated engagement with the raised face 22 of the beveled surface of the orifice member 12 by means of the spring 40 acting against washers 42 and 44. Passing through the spring and washers is a spindle 46 having an enlargement 48 at one end against which bears the washer 44. The other end of the spindle passes through the washer 42, the washer 42 being integrally formed with or otherwise secured to a screw portion 50 which threadably engages with the housing cover member 52. Tension of the spring 40 my be varied by adjusting the screw portion 50 of the washer member 42 within the housing cover 52. Once an adjustment is made, a lock nut (not shown) may be tightened against the cover member 52. Preferably, the outer end of the spindle 46 is protected by means of a screw cap 54 which threadably engages about the housing cover 52. The housing cover 52 is in turn secured to the housing 10 such as by a plurality of bolt means 58.

With reference now to FIG. 2 and the embodiment shown therein, the cylindrical orifice member 12 is provided with an exterior and outwardly facing annular recess 60 at the end of the orifice member in juxtaposition with the inwardly facing beveled surface 32 of the ring member 28. By virtue of the recess 60, annular ridges 62 and 64 are provided in the flow path between the orifice member 12 and the adjustable ring 28 so as to regulate operation of the safety relief valve as will be described hereafter.

Figure 3:
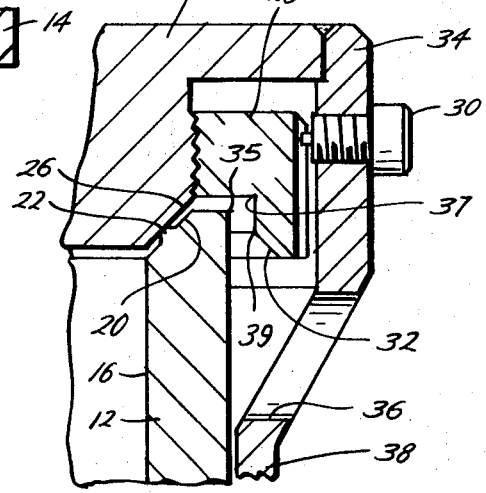
FIG. 3 is a partial cross-sectional view of the improved adjustable disk and another embodiment of the orifice member.

With respect to FIG. 3, a further embodiment is shown whereby the valve of the present invention may accommodate a gas, containing moisture. More specifically, moisture or other liquid within a gas stream tends to freeze when the gas in which it is carried is expanded across a restriction. Thus, for example, in the embodiment of FIG. 1, gas flowing through the valve after "popping" experiences a minimum area in its flow path between the seat or raised face 22 and the chamfered edge 26 of the disk 24. Upon expansion of the gas through such restriction, moisture in the gas tends to freeze and collect as ice on the surfaces of such seat and chamfered edge if flow through the valve continues for an extended period of time. This ice hinders effective closure of the valve.

In order to overcome the icing problem and with reference to FIG. 3, a shoulder 35 is provided exteriorly of the orifice member 12. Cooperating with the shoulder is an inwardly-facing groove 37 in the ring member 28 which meets the beveled surface 32 thereof to form an apex 39. The ring member is adjusted axially so that the apex 39 is below the shoulder 35 (in other words encloses the shoulder) when the valve is closed as shown in FIG. 3. As a consequence, when the valve opens, i.e. the disk 24 unseats, the flow area between the apex 39 and the shoulder 35 becomes the major restriction in the flow path of fluid through the valve. Any moisture present that is capable of forming ice forms such ice on the apex and shoulder surfaces and downstream of the raised face 22 or chamfered edge 26 and even downstream of the shoulder 35 and apex 39, and effective reseating of the disk upon valve closure is assured.

In operation and with reference to FIGS. 1 and 2, the safety relief valve of the present invention is secured by conventional means such as by bolting the flange 14 to a process vessel. Pressurized fluid within the vessel enters the bore 16 of the orifice member 12 as indicated by the arrow 18. Since the surface 26 of the disk member 24 is normally seated in sealing engagement with the raised face 22 of the beveled surface 20 of the orifice member 12, no fluid flows through the valve. However, the spring 40 is selected of a predetermined tension or modulus such that upon increase of pressure of the fluid to a predetermined level, such pressure will overcome tension of the spring and force the disk 24 away from the annular seat or raised face 22. This opening action is termed "popping"

of the valve whereby fluid flows between the disk 24 and the orifice member 12 across the annular raised face 22. Flow then proceeds between the ridges 62 and 64 and the ring member 28, past the outer edge 66 of the beveled surface 32 of the ring member 28, and then through the ports 36. The fluid is then finally exhausted from the housing 10 by means of the outlet 56 about which is provided a flange 70 for connection to an exhaust pipe if desired.

Assume for purposes of example that a spring 40 is selected with sufficient tension to maintain the disk 24 against the seat 22 of the orifice member until pressure of the fluid acting against the disk within the bore 16 reaches a "pop" pressure of 100 pounds per square inch. (As a practical matter, the disk 24 will "crack" or begin to open very slightly at a pressure just below the pop pressure.) So long as pressure of the fluid remains at approximately 100 p.s.i. or greater, the disk 24 will remain unseated to permit flow of fluid through the valve.

At the time of popping of the valve, the ridge 62 presents a point of obstruction in the flow path creating a minimum flow area between the ridge 62 and the beveled surface 32 of the ring member 28. This minimum flow area provides for a fast opening action of the valve by virtue of pressure of the fluid pushing the disk 24 rapidly away from the seat 22 of the orifice member 12.

As pressure of the fluid continues to move the disk 24 further away from the seat member 22 or toward maximum "lift," the ridge 64 presents a point of obstruction in the fluid flow path so that the minimum flow area is shifted to the annular space between such ridge 64 and the beveled surface 32 of the ring member 28. Pressure of the fluid against the restriction provided by the ridge 64 coacting with the beveled surface 32 of the ring member in combination with the effect of flow impingement of the fluid against the point 66 of the beveled surface of the ring member provides full and effective lifting action of the disk 24 for purposes of quickly exhausting the excessive pressure within the vessel being regulated.

As the fluid becomes exhausted from the vessel being regulated and fluid pressure begins to decrease, tension in the spring 40 forces the disk 24 back toward the seat 22 of the orifice member 12. The minimum flow area at this time is at a point between the ridge 62 and the beveled surface 32 of the ring member 28 and the disk 24 will reseat with only a slight drop in pressure below the "pop" pressure whereas in conventional safety relief valves this "blowdown" or closing action occurs at pressures substantially lower than pop pressure. The result is important since quick closing action prevents unwanted excessive exhaustion of fluid from within the vessel being regulated.

Blowdown may be regulated, i.e., the pressure at which the valve will close, may be regulated by threadably adjusting the ring member 28 toward or away from the orifice member 12. For example, if the ring member 28 is moved downward and toward the orifice member 12 as shown in FIG. 2, the valve will close at a pressure substantially lower than pop pressure whereas if the ring member 28 is upward and further from the orifice member 12 to provide less restriction between the ridge 62 and beveled surface 32, then the valve will close and the disk 24 will reseat at a pressure closer to and just below the pop pressure.

As explained previously, if the valve of the present invention is used to regulate a gas that contains moisture or other freezable substances and is operated under conditions where ice actually forms, then the embodiment of FIG. 3 is uniquely accommodative. Blowdown may still be regulated as explained previously although it is important that the ring member 28 not be adjusted so far away from the shoulder 35 of the orifice member 12 that the apex 39 of the ring member no longer is below the shoulder when the disk 24 is seated in a closed position.

Preferably, the beveled surface 20 of the orifice member 12, the chamfer 26 of the disk 24 and the beveled surface 32 of the ring member 28 are all at approximately a 45° angle relative to the axis of the bore 16 to permit relatively smooth flow of fluid as compared with sharper angles. Such angle for the beveled surface 32 of the ring member is particularly preferred since a lesser angle would require that the disk 24 lift a greater distance from the seat 22 to provide a given flow rate of fluid through the valve while a greater angle would decrease effectiveness of the ring member by deflecting flow of fluid thereby minimizing ability of the ring member 28 to adjust blowdown pressure of the valve as previously explained. However, it will be recognized that each of these angles may be varied somewhat without departing from the spirit of the present invention.

Through provision of the raised face 22 on the beveled surface 20 of the orifice member 12, a "knife action" is provided between such beveled surface and the chamfer 26 of the disk to sweep away any trash, dirt or other debris that might be present and which would otherwise hinder positive closure of the valve upon blowdown. The trapezoidal configuration of the raised face 22 is preferred for purposes of durability and efficiency although such raised face may be either slightly more pointed or more rounded with good results. Also, the raised face 22 may be provided integrally of the chamfer 26 of the disk 24 rather than on the beveled surface 20 of the orifice member but such location of the raised face is not preferred since flow of fluid past the face would tend to wear the face down faster than if located as shown in the drawings. The 45° angle of the beveled surface 20 (as well as the seating surface of the raised face 22) is preferred since it provides a "nesting" effect that results in longer seat life. This nesting effect allows both the disk 24 and the surface of the raised face 22 to stay in the same relationship to each other after each popping of the valve. Any brinelling that may occur will not affect ability of the disk to seat on the raised face, a problem encountered by conventional valves and particularly conventional valves of the flat swivel disk type wherein brinelling can occur at a different point after pop and thus result in rapid wear.

As compared with conventional devices wherein the disk is guided from above its seat during popping action, the present invention provides the sleeve 34 which engages about and guides along the orifice member 12. Several advantages flow, not the least of which is the compactness of the valve package that results compared with conventional devices. In addition, less precision is required in machining the valve of the present invention since only the orifice member 12, disk 24, ring member 28 and sleeve 34 must be precision fitted whereas in prior art devices the disk and seat as well as the biasing and housing means must all be precision fitted. Regardless of the precision with which most conventional valves are manufactured, strains that develop between the inlet and exhaust flanges of the valve cause misalignment and thus malfunctioning of conventional devices. By contrast, any piping stresses induced, for example, in the housing 10 between the inlet flange 14 and the exhaust flange 70 do not cause any misalignment of the disk 24 with respect to the orifice member 12 thereby obviating any malfunction from stress sources.

The present invention, therefore, is well adapted to carry out the objects and attain the ends and advantages mentioned as well as others inherent therein.

What is claimed is:

1. An improved safety relief valve for relieving high pressure within a vessel, comprising:
   (a) a cylindrical orifice member adapted at one end to be secured to a vessel for fluid communication therewith, said orifice member having an axial bore for flow of fluid therethrough and further including:
      (i) a beveled surface at the junction of the other end with the bore wall, (ii) said beveled surface having a raised face forming an annular seat coaxial with the bore, (b) a disk coaxial with the bore for normal seated engagement with the raised face of the beveled surface of the orifice member, the surface of the disk toward the beveled surface being chamfered at a supstantially complementary angle to the angle of the beveled surface so as to seat on the raised face thereof.

(c) a ring member adjustably secured peripherally of the disk and having an inwardly facing beveled surface adjacent the chamfer of the disk, (d) perforated sleeve means secured to the disk exteriorly of the ring member for slidable coaction with and about the orifice member so as to guide the disk in axial movement, and (e) biasing means operatively associated with said disk to seatingly bias the same toward the raised face of the orifice member but yieldable to unseat the disk upon exposure of said disk to a predetermined pressure from the vessel.

2. The valve device of claim 1 wherein the cylindrical orifice member (a) has an exterior and outwardly facing annular recess at its end in juxtaposition with the inwardly facing beveled surface of the ring member.

3. The valve device of claim 1 wherein the perforated sleeve means (d) secured to the disk exteriorly of the ring member for slidable coaction with and about the orifice member so as to guide the disk in axial movement comprises:
  a sleeve secured to the disk about the ring member, said sleeve tapering to a smaller diameter for slidable engagement about the orifice member, and
  a plurality of ports through and spaced about the circumference of the sleeve at the point of taper thereof.

4. The valve device of claim 1 wherein the ring member (c) is threadably secured about the periphery of the disk for axial adjusting movement of the ring relative to the disk.

5. The valve device of claim 1 wherein the raised face (a) (ii) of the orifice member beveled surface is of a trapezoidal cross-sectional configuration, the short parallel side of which faces inwardly.

6. The valve device of claim 1 wherein the bevel of the beveled surface (a) (i) of the orifice member (a) is inclined at approximately a 45° angle with the axis of the orifice member.

7. The valve device of claim 1 wherein the chamfer of the disk (b) is at approximately a 45° angle with the axis of the disk.

8. The valve device of claim 1 wherein the beveled surface of the ring member (c) is at approximately a 45° angle with the axis of the ring mmeber.

9. The valve device of claim 1 wherein the cylindrical orifice member (a) has an exterior and outwardly facing shoulder.

10. The valve device of claim 9 wherein, additionally, the ring member (c) has an inwardly-facing groove coacting with the beveled surface of the ring member to form an apex such that said apex and the shoulder of the orifice member form a restriction.

11. An improved safety relief valve for relieving high pressure within a vessel comprising:
  a body member,
  a cylindrical orifice member secured at one end to the body for fluid commuciation with the vessel, said orifice member having an axial bore for flow of fluid therethrough and further including,
    a beveled surface at the junction of the other end with the bore wall,
    said beveled surface having a raised face forming an annular seat coaxial with the bore, and
    an outwardly facing annular recess exteriorly of the orifice member at the same end thereof as the beveled surface having the raised face,
  a disk coaxial with the bore for normal seated engagement with the raised face of the beveled surface of the orifice member, the edge of the disk toward the the beveled surface being chamfered at a substantial complementary angle to the angle of the beveled surface so as to seat on the raised face thereof, said angle and complementary angle being at approximately 45° with the axis of the cylindrical orifice member,
  a ring member adjustably secured peripherally of the disk and having an inwardly facing beveled surface adjacent the chamfer of the disk,
  a sleeve member secured to the disk exteriorly about the ring member and tapering to a smaller diameter for slidable engagement about the cylindrical orifice member, said sleeve having a plurality of spaced ports at the point of taper, and
  biasing means operatively associated with the disk and body member for seatingly biasing the same toward the raised face of the orifice member but yieldable to unseat the disk upon exposure of said disk to a predetermined pressure from the vessel.

12. The safety relief valve of claim 9 wherein the ring member is threadably secured about the periphery of the disk for axial adjusting movement of the ring relative to the disk.

13. The safety relief valve device of claim 9 wherein the raised face of the orifice member beveled surface is of a trapezoidal cross-sectional configuration, the short parallel side of which faces inwardly.

14. The invention of claim 9 wherein the beveled surface of the ring member is at approximately a 45° angle with the axis of the ring member.

15. An improved safety relief valve for relieving high pressure within a vessel comprising:
  a body member,
  a cylindrical orifice member secured at one end to the body for fluid communication with the vessel, said orifice member having an axial bore for flow of fluid therethrough and further including,
    a beveled surface at the junction of the other end with the bore wall,
    said beveled surface having a raised face forming an annular seat coaxial with the bore, and
    an outwardly facing shoulder exteriorly of the orifice member at the same end thereof as the beveled surface having the raised face,
  a disk coaxial with the bore for normal seated engagement with the raised face of the beveled surface of the orifice member, the edge of the disk toward the beveled surface being chamfered at a substantial complementary angle to the angle of the beveled surface so as to seat on the raised face thereof, said angle and complementary angle being at approximately 45° with the axis of the cylindrical orifice member.
  a ring member adjustably secured peripherally of the disk and having an inwardly facing beveled surface adjacent the chamfer of the disk and an inwardly-facing groove coacting with the beveled surface to form an apex such that said apex and the shoulder of the orifice member form a restriction,
  a sleeve member secured to the disk exteriorly about the ring member and tapering to a smaller diameter for slidable engagement about the cylindrical orifice member, said sleeve having a plurality of spaced ports at the point of taper, and
  biasing means operatively associated with the disk and body member for seatingly biasing the same toward the raised face of the orifice member but yieldable to unseat the disk upon exposure of said disk to a predetermined pressure from the vessel.

16. The safety relief valve of claim 15 wherein the ring member is threadably secured about the periphery of the disk for axial adjusting movement of the ring relative to the disk.

17. The safety relief valve device of claim 15 wherein the raised face of the orifice member beveled surface is of a trapezoidal cross-sectional configuration, the short parallel side of which faces inwardly.

18. The invention of claim 15 wherein the beveled surface of the ring member is at approximately a 45° angle with the axis of the ring member.

References Cited

UNITED STATES PATENTS

| Re. 23,645 | 4/1953 | Redol | 137—478 |
| 2,995,147 | 8/1961 | Bergquist | 137—475 |
| 3,074,425 | 1/1963 | Kikendall | 137—477 |
| 3,354,900 | 11/1967 | Ferrill | 137—477 |

HAROLD W. WEAKLEY, Primary Examiner

U.S. Cl. X.R.

137—478, 543.23